(12) United States Patent
Cargnini et al.

(10) Patent No.: US 10,222,992 B2
(45) Date of Patent: Mar. 5, 2019

(54) SYNCHRONIZATION METHOD AND APPARATUS FOR AN INTERCONNECTION NETWORK USING PARALLEL-HEADERLESS TDMA ROUTING

(71) Applicant: HGST Netherlands B.V., Amsterdam (NL)

(72) Inventors: Luis Cargnini, San Jose, CA (US); Luiz M. Franca-Neto, Sunnyvale, CA (US)

(73) Assignee: WESTERN DIGITAL TECHNOLOGIES, INC., San Jose, CO (US)

( * ) Notice: Subject to any disclaimer, the term of this patent is extended or adjusted under 35 U.S.C. 154(b) by 448 days.

(21) Appl. No.: 15/011,541

(22) Filed: Jan. 30, 2016

(65) Prior Publication Data

US 2017/0220250 A1   Aug. 3, 2017

(51) Int. Cl.
*G06F 3/06* (2006.01)
*H04L 29/08* (2006.01)

(52) U.S. Cl.
CPC .......... *G06F 3/061* (2013.01); *G06F 3/0647* (2013.01); *G06F 3/0683* (2013.01); *H04L 67/1097* (2013.01)

(58) Field of Classification Search
CPC ...... G06F 3/061; G06F 3/0647; G06F 3/0683; H04L 67/1097
See application file for complete search history.

(56) References Cited

U.S. PATENT DOCUMENTS

| | | |
|---|---|---|
| 6,417,943 B1 | 7/2002 | Saraswat et al. |
| 6,529,960 B2 | 3/2003 | Chao et al. |
| 7,218,616 B2 | 5/2007 | Karim |
| 7,433,363 B2 | 10/2008 | Rosen et al. |
| 7,581,081 B2 | 8/2009 | Gonzalez et al. |
| 7,620,736 B2 | 11/2009 | Westfall |

(Continued)

FOREIGN PATENT DOCUMENTS

CN   102638411 A   8/2012

OTHER PUBLICATIONS

Time Division Multiplexing of Network Access by Security Groups in High Performance Computing Environments <http://repository.asu.edu/items/17929>.

(Continued)

*Primary Examiner* — Henry Tsai
*Assistant Examiner* — Christopher A Daley
(74) *Attorney, Agent, or Firm* — Patterson & Sheridan, LLP; Steven Versteeg

(57) ABSTRACT

Embodiments of the present disclosure generally relate to a cloud computing network, or datacenter network, and a method of transferring information among processing nodes in a cloud computing network or datacenter. The network may include a hub that is coupled to a plurality of nodes so that data is transferred between nodes through the hub. Data from different nodes may be written into a slot within the hub, read, and then written into a slot within the destination node. Due to the proximity of the nodes to the hub, or even due to the amount of data to be written, the data may be written at different clock phases. The read may occur one or more clock cycles after the data has been written into the hub.

20 Claims, 5 Drawing Sheets

(56) References Cited

U.S. PATENT DOCUMENTS

| | | | |
|---|---|---|---|
| 7,716,396 B1* | 5/2010 | Liu | G06F 9/526 |
| | | | 710/1 |
| 8,014,401 B2 | 9/2011 | Radulescu | |
| 8,370,551 B2 | 2/2013 | Ohmacht et al. | |
| 8,739,179 B2 | 5/2014 | Tripathi | |
| 8,811,378 B2 | 8/2014 | Benner et al. | |
| 8,897,184 B2 | 11/2014 | Pettus et al. | |
| 8,972,601 B2 | 3/2015 | Padhye et al. | |
| 9,871,691 B2* | 1/2018 | Anand | H04L 41/0668 |
| 2005/0132089 A1 | 6/2005 | Bodell et al. | |
| 2008/0186998 A1 | 8/2008 | Rijpkema | |
| 2011/0243074 A1 | 10/2011 | Shin et al. | |
| 2013/0250802 A1 | 9/2013 | Yalagandula et al. | |
| 2014/0095691 A1* | 4/2014 | Ganguli | H04L 41/5025 |
| | | | 709/224 |
| 2014/0133487 A1 | 5/2014 | Margalit et al. | |
| 2014/0133493 A1 | 5/2014 | Miliavsky et al. | |
| 2014/0177742 A1 | 6/2014 | Maltsev et al. | |
| 2014/0375528 A1 | 12/2014 | Ling | |
| 2015/0026432 A1* | 1/2015 | Borkenhagen | G06F 15/80 |
| | | | 712/29 |
| 2016/0301624 A1* | 10/2016 | Gonzalez | G06F 9/5083 |
| 2016/0344786 A1* | 11/2016 | Fawcett | G06F 17/30516 |
| 2016/0373502 A1* | 12/2016 | Smith | H04L 65/601 |
| 2017/0063705 A1* | 3/2017 | Gilson | H04L 47/286 |
| 2017/0125913 A1* | 5/2017 | Ling | H01Q 15/02 |
| 2017/0223117 A1* | 8/2017 | Messerli | H04L 67/16 |
| 2017/0262303 A1* | 9/2017 | Allen | G06F 9/45545 |
| 2017/0277186 A1* | 9/2017 | Ross | H04W 4/026 |

OTHER PUBLICATIONS

Halperin, Daniel et al. Augmenting Data Center Networks with Multi-Gigabit Wireless Links SIGCOMM'11, Aug. 15-19, 2011, Toronto, Ontario, Canada.

Vardhan, Hars et al. 60 GHz Wireless Links In Data Center Networks Computer Networks, vol. 57, Jan. 15, 2014, pp. 192-205.

Zhou, Xia et al. Mirror on the Ceiling: Flexible Wireless Links for Data Centers SIGCOMM'12, Aug. 13-17, 2012, Helsinki, Finland.

On the Feasibility of Completely Wireless Data Centers Paper #22, 14 pages.

Ramachandran, Kishore et al. 60 GHz Data-Center Networking: Wireless—Worry Less? WINLAB, Rutgers University, North Brunswick, NJ; NEC Laboratories American, Princeton, NJ, Jul. 14, 2008.

Introduction to Millimeter Wave Wireless Communications <http://www.informit.com/articles/article.aspx?p=2249780&seqNum=3>.

Wireless data center networking with steered-beam mmWave links <http://ieeexplore.ieee.org/xpl/login.jsp?tp=&arnumber=5779470>.

Skywalk a Topology for HPC Networks with Low-delay Switches <http://navet.ics.hawaii.edu/~casanova/homepage/papers/fujiwara_ipdps2014.pdf>.

Swap-and-randomize_ A Method for Building Low-latency HPC Interconnects http://www.computer.org/csdl/trans/td/preprint/06860278-abs.html.

The PERCS High-Performance Interconnect <http://htor.inf.ethz.ch/publications/img/ibm-percs-network.pdf>.

Abts, Dennis and Kim, John—Synthesis Lectures on Computer Architecture #14 High Performance Datacenter Networks—Architectures, Algorithms, and Opportunities Morgan & Claypool Publishers 2011.

* cited by examiner

SYNCHRONIZATION METHOD AND APPARATUS FOR AN INTERCONNECTION NETWORK USING PARALLEL-HEADERLESS TDMA ROUTING

BACKGROUND OF THE DISCLOSURE

Field of the Disclosure

Embodiments of the present disclosure generally relate to a cloud computing network, a datacenter, and more specifically to circuits for synchronization and routing of data in time slots.

Description of the Art

High performance computing (HPC) achieves record performance in data processing by the use of a low latency, proprietary, massive interconnect network among all processing nodes. HPC may apply to one application running on one operating system and using all available processing nodes. HPCs are priced at millions of dollars per installed realization.

Grid and cloud computing, in opposition, runs many applications on many operating systems. Being sensitive to cost, cloud computing uses largely available ingredients. For example, an assembly of servers, processors, memories, and storage using buses and I/O controllers may be used. All the servers in cloud computing are interconnected by largely available switches. For general purpose and lower cost realizations, Ethernet switches may be used. In high performance realization, InfiniBand switches may be used.

Switches in cloud computing, however, are responsible for large latencies when a network is heavily loaded compared to when the network is unloaded or lightly loaded. This is due to contention for resources in the switch and imply in packets of data being held in buffers or discarded.

Thus, there is a need for a low latency solution for interconnects that can avoid contention in the network. The solution needs to be low cost and easily adopted in cloud computing.

SUMMARY OF THE DISCLOSURE

Embodiments of the present disclosure generally relate to a cloud computing network and a method of transferring information among processing nodes in a cloud computing network or datacenter. The network may include a hub that is coupled to a plurality of nodes so that data is transferred between nodes through the hub. Data from different nodes may be written into a slot within the hub, read, and then written into a slot within the destination node. Due to the proximity of the nodes to the hub, or even due to the amount of data to be written, the data may be written at different speeds. The read may occur one or more clock cycles after the data has been written into the hub.

In one embodiment, a datacenter comprises one or more racks; and a plurality of servers disposed in each rack, wherein each server includes a hub and a plurality of processing nodes, wherein each processing node of a given server is coupled to a corresponding hub of the server, wherein the plurality of processing nodes includes a first node spaced a first distance from the hub and a second node spaced a second distance from the hub, wherein the second distance is greater than the first distance, wherein the server contains logic to delay communication of data by a predetermined amount at the hub from being routed to an intended node.

In another embodiment, a method of transferring data between nodes on a motherboard, wherein the motherboard includes a plurality of nodes and a hub, wherein each node of the plurality of nodes is coupled to the hub comprises writing first data from a first node into a first slot in the hub, wherein the first data is written at a first write phase or delay wherein the writing occurs for a first write time period; writing second data from a second node into a second slot in the hub, wherein the second data is written at a second write phase or delay that is less than the first write phase or delay, wherein the writing occurs for a second write time period; reading data from the first slot at a first read phase or delay; and reading data from the second slot at a second read phase or delay, wherein the second read phase or delay and the first read phase or delay are substantially identical.

In another embodiment, a method of transferring data between nodes on a motherboard, wherein the motherboard includes a plurality of nodes and a hub, wherein each node of the plurality of nodes is coupled to the hub comprises writing first data from a first node into a first slot in the hub; writing second data from a second node into a second slot in the hub; reading data from the first slot, wherein the reading occurs simultaneous with writing the second data from the second node into the second slot; writing third data from a third node into a third slot in the hub; reading data from the second slot, wherein the reading occurs simultaneous with writing the third data from the third node into the third slot; and writing the data from the first slot into a slot in the second node, wherein the writing occurs simultaneous with writing the third data from the third node into the third slot.

At the physical level, all communications taught in this application are based on point-to-point electrical signaling.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Figure 1:
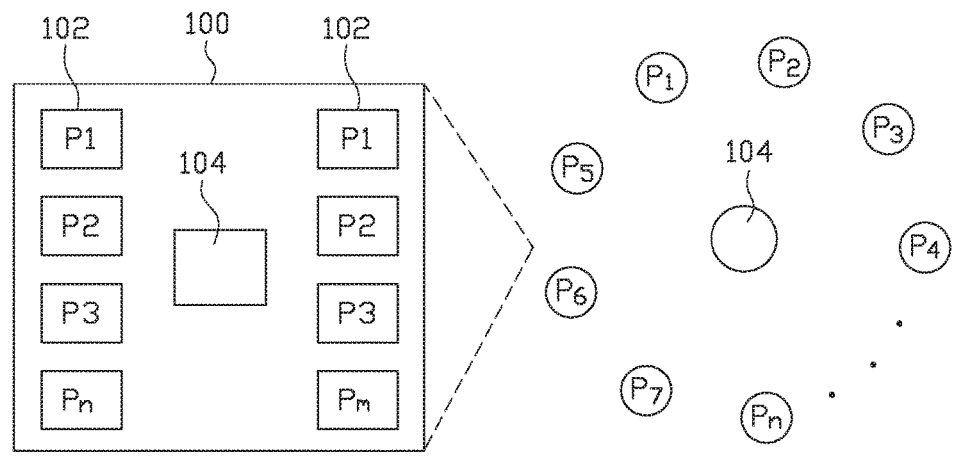
FIG. 1 illustrates a motherboard with processing nodes and a hub using a hub and spokes interconnection topology, according to one embodiment.

Embodiments of the present disclosure generally relate to a cloud computing network and a method of transferring information among processing nodes in a cloud computing network or datacenter. The network may include a hub that is coupled to a plurality of nodes so that data is transferred between nodes through the hub. Data from different nodes may be written into a slot sent towards the hub, read, and then written into a slot sent towards the destination node. Due to differences in the distances of the nodes to the hub, or even due to the amount of data to be written, the data may arrive at the hub at different phases or delays. The read may occur one or more clock cycles after the data has been written into the hub. A processing node in such an environment is a node with processor and memory (DRAM). These processing nodes can be physically placed on a printed circuit board (PCB), a daughtercard or a motherboard. In one embodiment, for illustrative purpose, not limiting in any sense, a motherboard may contain several processing nodes as illustrated in FIG. 1. Accordingly, a hub chip, or set of chips, working as a hub routes the communication between those processing nodes.

Figure 2:
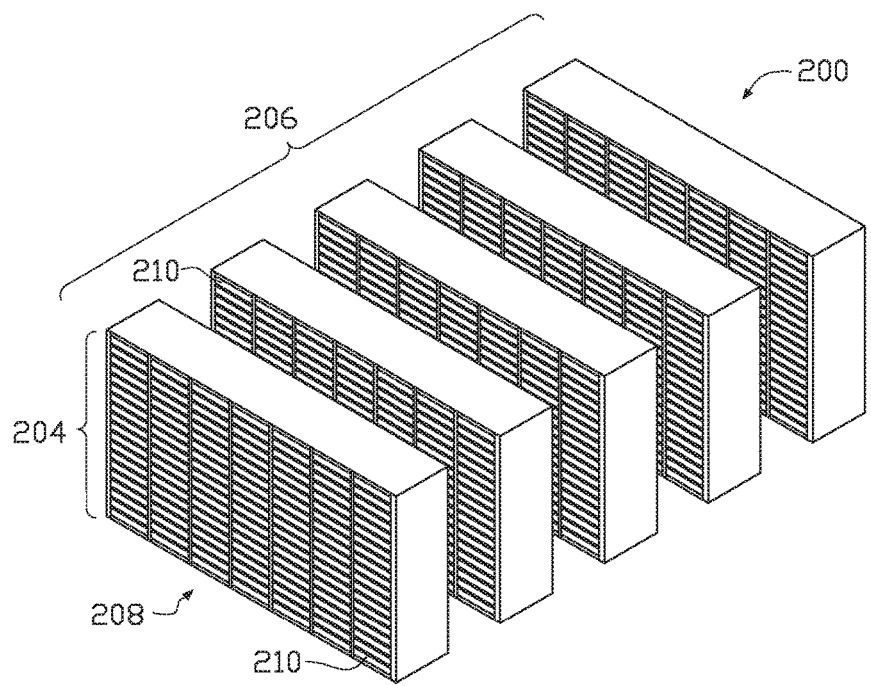
FIG. 2 illustrates a data center for a cloud computing network, according to one embodiment.

A set of motherboards, each having several processing nodes, can be arranged vertically as server blade boards in a rack, or can be arranged horizontally in a horizontal stacked, as illustrated in FIG. 2. In this illustration, the communication from one motherboard to another motherboard at an opposing rack is made using point-to-point wireless links. These wireless links make a daisy chain across several opposing racks. Motherboards on the same vertical rack, or on racks in the same aisle, may be connected by copper-based high-speed backplanes as taught in a related patent application by the inventor.

Those skilled in the art will recognize that while this document refers to "motherboards" stacked in racks, the concept is readily extended to mean "servers" horizontally stacked in racks, or "blade servers" vertically oriented and placed in racks.

Each processing node is fully connected to any other processing node in a datacenter using the virtual circuits taught in a related disclosure by the inventor entitled "A Cloud Computer Realized in a Datacenter Using mmWave Radio Links for a 3D Torus", which is incorporated herein by reference, filed on a concurrent day herewith. Said virtual circuits are realized by time slots in the communication between processing nodes and hubs, and also between hubs relaying information to other hubs towards the target processing node.

FIG. 1 illustrates how processing nodes 102 can be realized in a motherboard 100 with a central hub 104 to support communications between them. A processing node 102 may contain a processor with multiple cores, or a multi-socket processor, which accesses its own local memory directly without depending on the hub 104. Each processing node 102 is configured to access memory of other processing nodes 102 in the same motherboard 100 by intermediation of the hub 104 in their motherboard 100. A single hub 104 is thus used to support this non-local same motherboard memory access. Those skilled in the art will recognize that the motherboard 100 can also be featured with solid-state non-volatile memory (NVM) storage accessible by each processing node 102 as local storage space directly or as remote storage space by intermediation of the hub 104 in the motherboard 100.

Once the motherboards, such as motherboard 100, are arranged in racks forming columns (as shown in FIG. 2), a processing node 102 can reach memory of another processing nodes in different motherboards, in any place inside the datacenter. In such a case, the intermediation of more than one hub is necessary. Those skilled in the art will recognize that each of the hubs 104 in this disclosure has a direct interface to all memory available in the motherboard 100 where the hub 104 resides.

FIG. 2 illustrates a datacenter 200 for a cloud computing network, according to one embodiment. The data center 200 includes a plurality of motherboards 100. The plurality of motherboards 100 are positioned in a plurality of racks 204. The plurality of racks 204 of motherboards 100 are arranged in a grid-like structure having columns 206 and rows 208. The motherboards 100 in each rack 204 are electrically connected. The racks 204 are electrically connected within the column 206. The rows 208 of racks 204 are virtually connected across the row 208. Each motherboard 100 may include a virtual connector 210 configured to virtually connect rows 208 of racks 204 of integrated circuits 202 across a row 208. In one embodiment, the virtual connector 210 may be an RF transmitter/receiver.

Within the datacenter, data moves within the motherboard from one node to another node through a hub. The data from one node to each other node in the same motherboard are placed in specific and predetermined time slots and transmitted to the hub. Specific position in the time slot sequence determines destination of the bit. The data are received then written in special registers within the hub. The data is then read from those special registers in the hub and written into time slots in a data stream towards the intended destination node. The various nodes that are coupled to the hub may be disposed at different distances from the hub which may imply in different optimal clock phase for sampling incoming data and for writing data into the special registers within the hub. Thus, care needs to be taken to ensure that the data is not read within the slot in the hub until after the data has been written into the slot within the hub.

Those skilled in the art will recognize that since the time slots in a data stream imply final destination, additional information is required to for the receiver of said data stream to determine where to start counting the position in the frames of time slots. In one embodiment, an additional signal called data frame (DF), sent parallel to the data stream inform the length of the data frame inside which the sequence of slots should be counted. These details are fully discussed in a related patent application filed on a concurrent date herewith entitled "An All Connected By Virtual Wires Network of Data Processing Nodes", which is incorporated herein by reference.

Figure 3:
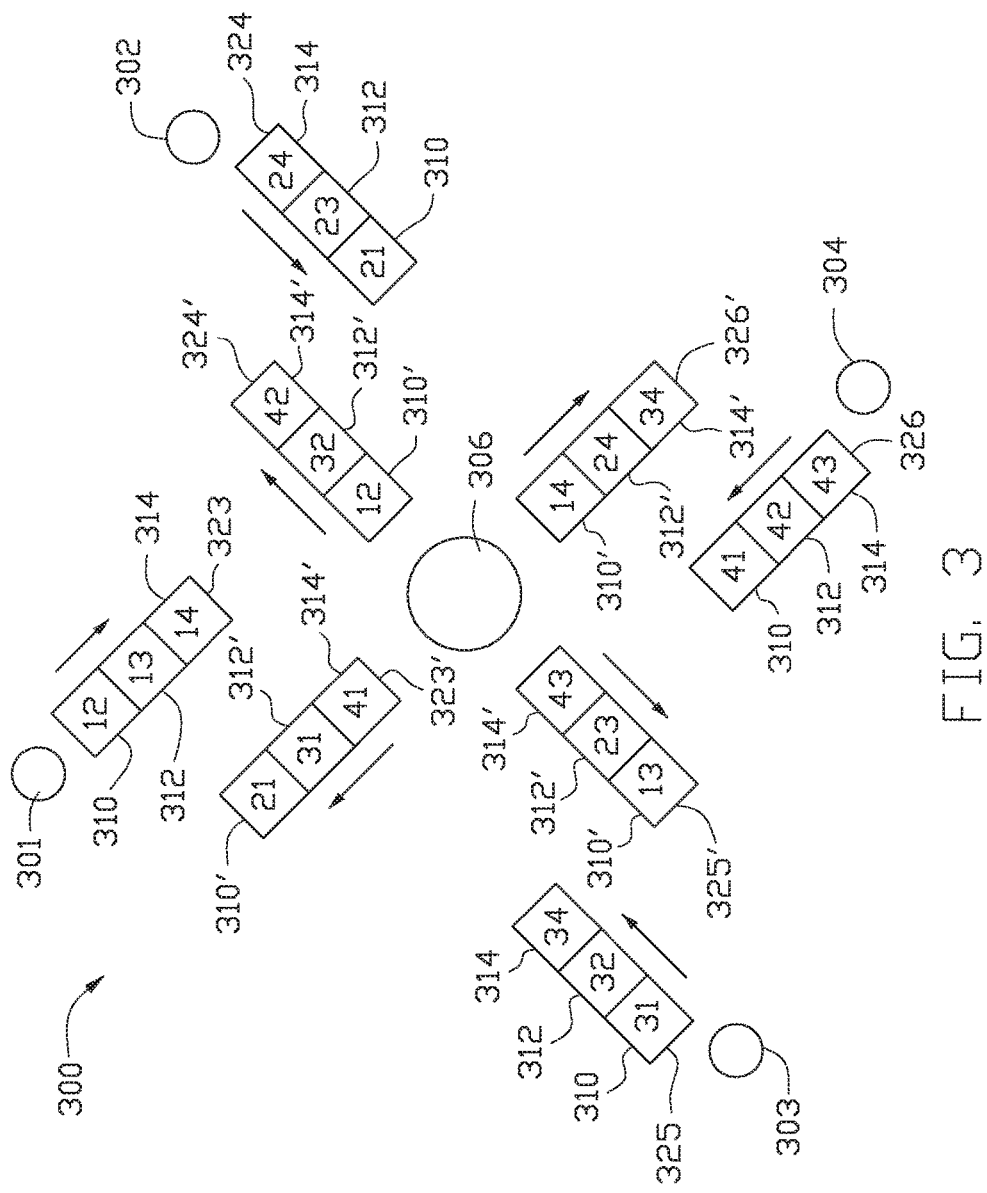
FIG. 3 illustrate an example of transferring data in a cloud computing network among four processing nodes with a hub, according to one embodiment.

FIG. 3 illustrates an example of transferring data in a cloud computing network among nodes in a motherboard configuration, according to one embodiment. In the embodiment shown in FIG. 3, a single hub with four nodes is shown. It is to be understood that more or less nodes may be coupled to the hub and the four nodes are merely for illustration purposes.

FIG. 3 illustrates a motherboard 300 having four nodes 301, 302, 303, 304, and a central hub 306. The central hub 306 facilitates communication among the nodes 301-304. The central hub 306 receives data streams 323, 324, 325, 326 from the nodes 301-304 and distributes the information to the correct node 301-304. The data streams 323-326 of information contain frames of data that repeat in time. Inside those frames of data, a plurality of time slots are shown. For each frame in the data stream, slots are numbered to inform source and destination of bits. The skilled in the art will recognize that each time slot may represent a bit, but multiple synchronized lanes might augment the data rate para parallelization of data transmission without departing from the spirit of the invention being described.

Generally, for n-nodes in a set similar to communication ring with a hub 300, the number of time slots needed is equal to n−1. Therefore, for communication ring 300, three time slots are needed. Each string 323-326 includes time slots 310, 312, 314 in each data frame.

Each slot has assigned to hold data for a specific node. For example, node 301 includes a string 323 having slots 310, 312 and 314. Slot 310 is designated 12 because the slot 310 has data to be sent from node 301 to node 302. Similarly, slot 312 is designated 13 because the slot 312 has data to be sent from node 301 to node 303. Finally, slot 314 is designated 14 because the slot 314 has data to be sent form node 301 to node 304. Nodes 302, 303 and 304 are similar to node 301 in that node 302 includes a string 324 having slots 310, 312 and 314. Slot 310 in string 324 includes data designated 21 to be sent from node 302 to node 301. Slot 312 in string 324 includes data designated 23 to be sent from node 302 to node 303. Slot 314 in string 324 includes data designated 24 to be sent form node 302 to node 304. Node 303 includes string 325 that includes slots 310, 312 and 314. Slot 310 in string 325 includes data designated 31 to be sent from node 303 to node 301. Slot 312 in string 325 includes data designated 32 to be sent from node 303 to node 302. Slot 314 in string 325 includes data designated 34 to be sent from node 303 to node 304. Node 304 includes string 326 that includes slots 310, 312 and 314. Slot 310 in string 325 includes data designated 41 to be sent from node 304 to node 301. Slot 312 in string 325 includes data designated 42 to be sent from node 304 to node 302. Slot 314 in string 325 includes data designated 43 to be sent from not 304 to node 303.

The central hub 306 receives the strings 323-326 from the nodes 301-304. The central hub 306 determines which messages are meant for each respective node. The central hub 306 then sends strings of information to each respective node 301-304 with messages meant for that node. The hub 306 organizes data received and routes the data to the appropriate node through strings 323'-326'. Each string 323'-326' includes nodes 310', 312' and 314' for data from the respective nodes.

Central hub 306 sends string 323' to node 301. String 323' includes the data from nodes 302, 303 and 304. Time slot 310' in string 323' contains data designated 21 that is coming to node 301 from node 302. Slot 312' in string 323' contains data designated 31 that is coming to node 301 from node 303. Slot 314' in string 323' contains data designated 41 is coming to node 301 form node 304. Similarly, string 324' includes data form nodes 301, 303 and 304 that is being sent to hub 302. Slot 310' in string 324' includes data designated 12 that is combing from node 301 to node 302. Slot 312' in string 324' includes data designated 32 that is coming to node 302 from node 303. Slot 314' in string 324' includes data designated 42 that is coming to node 302 from node 304. String 325' includes data from nodes 301, 302 and 304 that is being sent to node 303. Slot 310' in string 325' includes data designated 31 that is being sent to node 303 form node 301. Slot 312' in string 325' includes data designated 32 that is being sent to node 303 from node 302. Slot 314' in string 325' includes data designated 433 that is being sent to node 303 from node 304. String 326' includes data from notes 301, 302 and 303 that is being sent to node 304. Slot 310' in string 326' includes data designated 41 that is being sent to node 304 form node 301. Slot 312' in string 326' includes data designated 42 that is being sent to node 304 from node 302. Slot 314' in string 326' includes data designated 43 that is being sent to node 304 from node 303.

The skilled in the art will recognize that the data frames with those numbered slots repeat in time, with the source and destination of data in each slot remaining the same.

Figure 4:
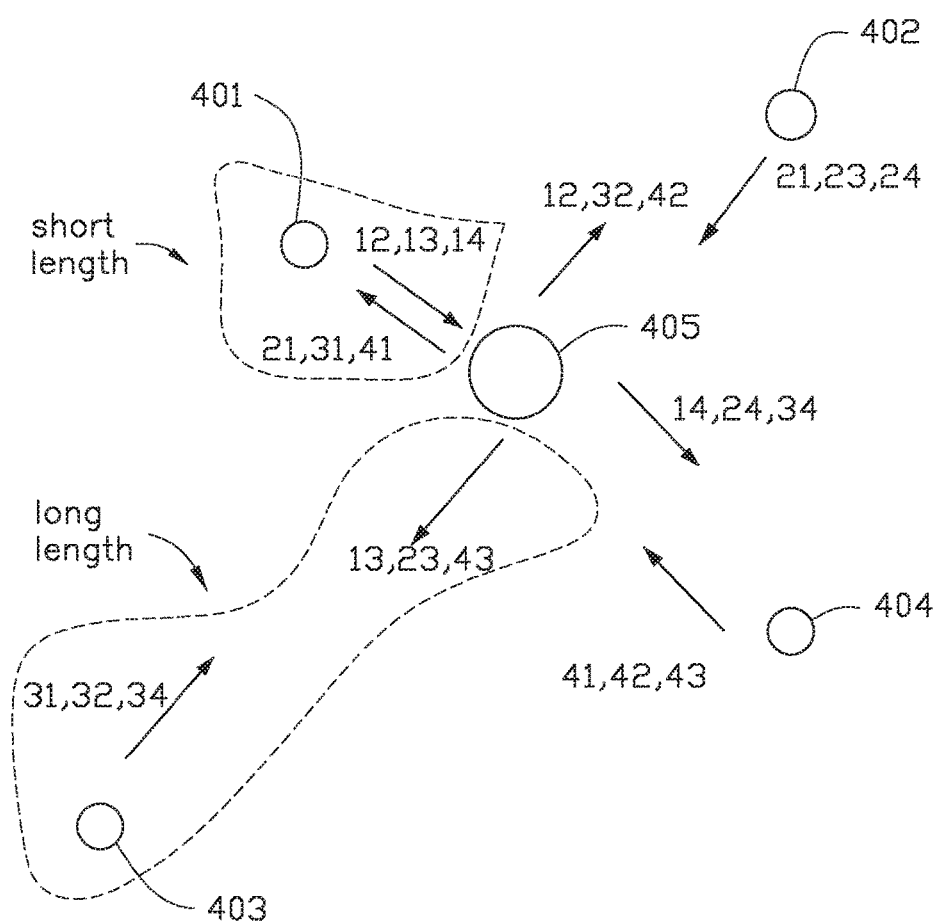
FIG. 4 highlights the general case of a set of 4 processing nodes and a hub.

FIG. 4 highlights the general case of a set of 4 processing nodes 401-404 and a hub 405. The difference in length of communication links between the processing nodes 401-404 and the hub 405 are exaggerated for emphasis. In an embodiment, the processing nodes 401-404 and hub 405 are synchronous, that is, they use the same reference clock. The nodes 401-404 transmit their data to the hub 405 according to their own local clock, which is synchronized to a global clock. The hub 405 also uses its local clock, also synchronized to the global clock, to receive data from each processing node and to route the data to their destination nodes. The skilled in the art will then recognize the need to reconcile the differences in data alignment from the processing nodes 401-404 while receiving and routing data.

Figure 5:
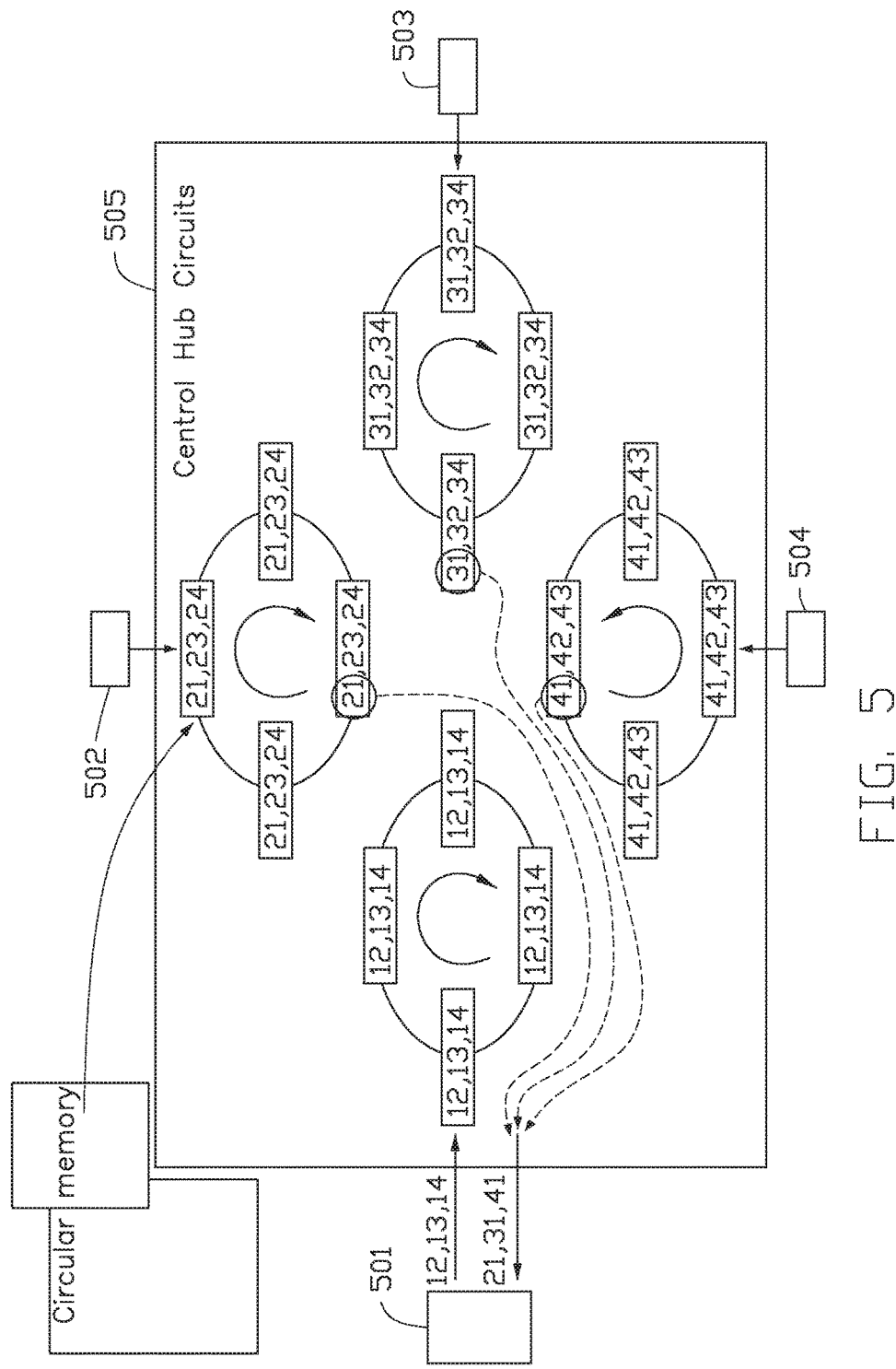
FIG. 5 shows an embodiment using a functional unit called circular memory to reconcile the differences in alignment from data coming from each node.

FIG. 5 shows an embodiment using a functional unit called circular memory to reconcile the differences in alignment from data coming from each node. In this embodiment there are four processing nodes 501-504, and each node 501-504 streams data that comes in frames containing a triad of time slots that determine the destination node of each bit of information in a triad. Data is streamed continuously, and frames containing triads of data in time slots are coming continuously from each of the nodes. In this example, each incoming frame with its triad is written into a circular memory. As shown in FIG. 5, since there are four incoming streams from the processing nodes, there are correspondingly four circular memory units.

In an embodiment, each circular memory has four memory positions as shown in FIG. 5. Each memory position has space for a frame of data with three bits of data, each meant to a different destination node. Once a frame of data is received, the data is written to a first memory position in the corresponding circular memory. The next frame of data from the same node will be written in the next memory position clockwise from the previous written position. The subsequent writings will complete the circle in the circular memory and the next incoming frame will overwrite the data in said first memory position. Subsequent incoming frames will overwrite continuously data written four frames back in the stream of data. This process is independently being followed in every one of the four circular memories in FIG. 5.

Those skilled in the art will recognize that the writing into each of the circular memory may be processed with assistance of a clock or a strobe signal transmitted by each node, thus ensuring proper data alignment with the writing operation into each circular memory. Those skilled in the art will then recognize that the circular memories function as elements to separate clock domains. The writing process in each circular memory uses a synchronized clock, but their phases are only relevant to the writing operation of their respective data into the corresponding circular memory.

The reading of data out of the four circular memory units however uses the hub local clock, which is synchronous to all those node clocks, but bears no pre-determined phase relation. To reconcile these differences in phase from the clock from the nodes and the hub clock, the circular memories in an embodiment has four memory positions. In one embodiment, the hub reads from memory positions that have data written more than a clock cycle before, and this data will not be overwritten for more than a clock still. Thus making the read operation by the hub to occur on a stable data, which will be sampled by the reading clock of the hub and will be stable data for the full duration of the read operation.

In FIG. 5, it's shown how the stream of data towards node 501 is constructed by the hub 505. In an embodiment, frames of triad of data are constructed from the first bit from memory positions in each circular memory. Similarly to the writing process, the hub reads the next memory position clockwise from each of the four circular memories to construct the next frame in the data stream towards node 501. The hub keeps repeating this reading and frame constructing process continuously.

The skilled in the art will recognize that different elements of the data triad in each memory position of the four circular memory units will be used by the hub to construct the frames and bit stream towards the other nodes.

The skilled in the art will also recognize that common ancillary circuits for data handing in the hub were omitted for clarity, while still completely describing the hub operation and necessary data and clock and strobes signals are completely described in the use.

Figure 6:
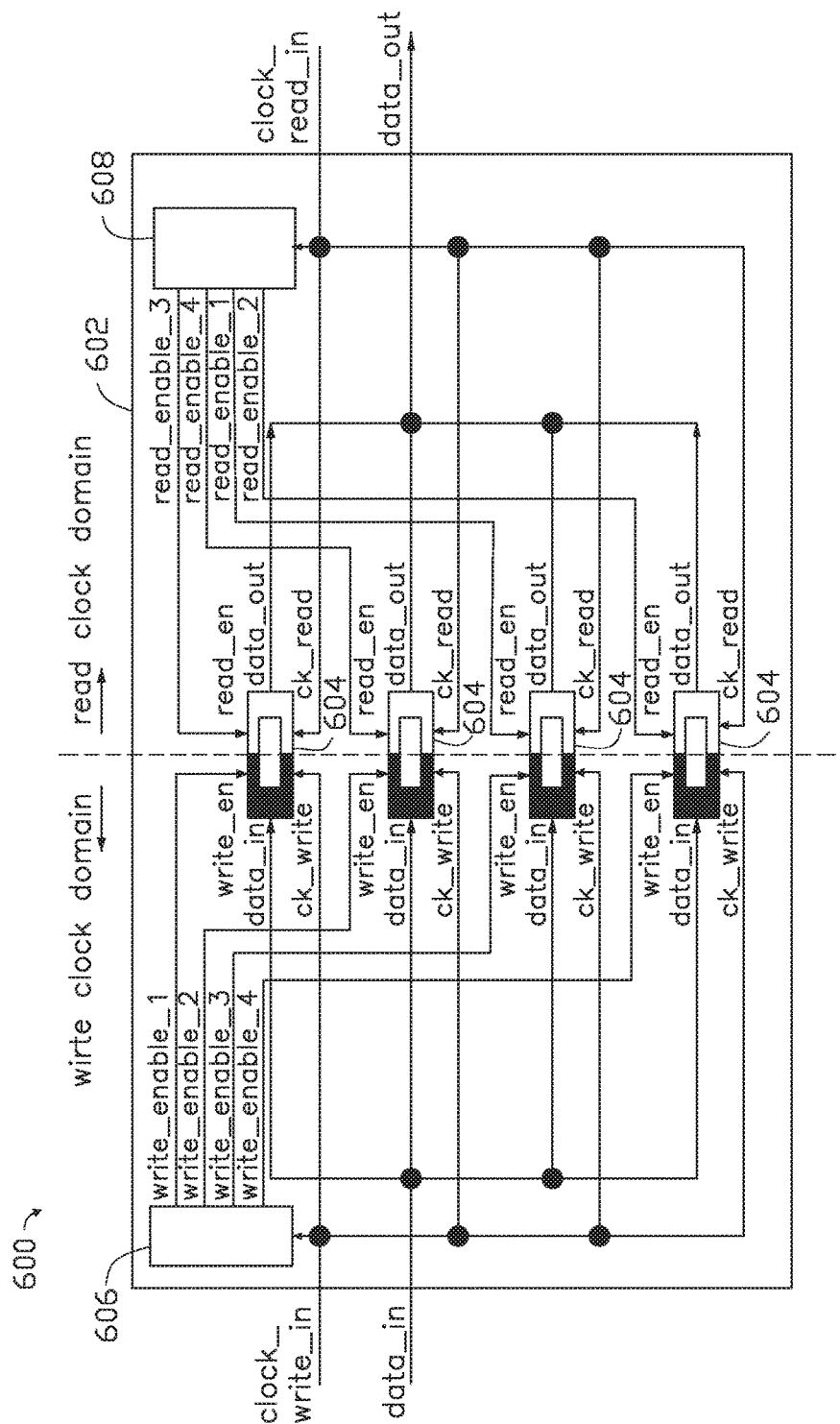
FIG. 6 is a schematic illustration showing a simplified circuity and memory blocks for phase adjustment of incoming data from processing nodes used by the hub 600 according to one embodiment.

FIG. 6 is a schematic illustration showing a Circular Memory circuit realization 600 according to one embodiment. The Circular Memory 600 includes a board for the circuit elements 602 having a plurality of memory positions 604, where a single bit or a triad of data can be written depending on the size of the memory provided in each memory position 604. A writing address pointer 606 and a reading address pointer 608 are also provided. The skilled in the art will recognize that the write operation into a memory position uses a write clock and the read operation to a memory position uses a reading clock. Writing clock and reading clock define two independent clock domains, as indicated in FIG. 6, and readily recognized by the skilled in the art. A clock_write_in line is present as is a data_in line. Similarly, a clock_read_in line is present as is a data_out line. The clock_write_in line is connected to each memory position 604. Similarly, the data_in line is connected to each memory position 604 within the board 602. The data_out line is connected to each memory position 604, and the clock_read_in line is connected to each memory position 604. The writing address pointer 606 has separate write_enable lines (labeled write_enable_1, write_enable_2, write_enable_3 and write_enable_4) that are separately connected to separate memory positions 604. For example only, there are four memory positions 604. Similarly, the reading address pointer 608 has separate read_enable lines (labeled read_enable_1, read_enable_2, read_enable_3 and read_enable_4) that are separately connected to separate memory positions 604. The clock_write_in is always operating as is the data_in line. Similarly, the clock_read_in and data_out lines are always operating. However, writing only occurs when one or more write_enable lines are operating. Similarly, reading only occurs when one or more read_enable lines are operating. The circular memory operation 600 makes sure the writing and reading operation occurs at different memory positions. Data is written at one memory position and read at another memory position two memory address ahead. Write operation than move to another memory position while read operation also move to another, keeping their physical distance in memory positions all the time. This makes sure a read operation occurs at stable data, that is, data written a few clock cycles before and data which will not be overwritten for a few clock cycles more.

Those skilled in the art will recognize that a larger number of memory positions in a circular memory make the hub support even significant amplitude of jitters in the phase of writing and reading clocks and the hub will still operate correctly. However, a larger number of memory positions imply data read from a memory position to form the data stream to be send to a node will be using data written a larger number of clock cycles in the past. That means that latency through the hub augments with number of memory positions in its circular memories.

The skilled in the art will recognize that all discussion and figures illustrated two uni-directional communication channels to each point-to-point link, and that is done to support higher data rates.

The skilled in the art will also recognize that the time-slot based communication schemes taught herein and in related patent applications discussed above imply all the processing or routing nodes involved in relaying information will have been programmed to extracted data from an incoming data stream and either consume that data, if it is the intended destiny, or re-transmit the data inserting said data in specific outgoing time slots. This means time-slot position carries routing information, as the skilled in the art will recognize, and this also means routing information in the topologies discussed is a pre-programmable but fixed for the duration the designer of the topology intended to use the network for a desired processing job or task. In this sense, the time-slot based network disclosed herein and in the related applications discussed above routes data in a pre-programmed functionality similar to what would have been achieved if an all-wired point to point network with physical wires would provide.

While the foregoing is directed to embodiments of the present disclosure, other and further embodiments of the disclosure may be devised without departing from the basic scope thereof, and the scope thereof is determined by the claims that follow.

What is claimed is:

1. A datacenter, comprising:
   one or more racks; and
   a plurality of servers disposed in each rack, wherein
      each server includes a hub and a plurality of processing nodes,
      wherein each processing node of a given server is coupled to a corresponding hub of the server,
      wherein the plurality of processing nodes includes a first node spaced a first distance from the hub and a second node spaced a second distance from the hub,
      wherein the second distance is greater than the first distance,
      wherein the server contains logic to delay communication of data by a predetermined amount at the hub from being routed to an intended node, and
      wherein reading the data occurs with a delay of at least one clock cycle after the data has been written to the hub.

2. The datacenter of claim 1, wherein the hub comprises:
circular memory units, where circular memory units further comprise
a writing address pointer;
a read address pointer; and
a data location corresponding to each node, wherein the writing address pointer is coupled to each data location and wherein the read address pointer is connected to each data location.

3. The datacenter of claim 2, wherein the circular memory further comprises a clock write line that is connected to each data location.

4. The datacenter of claim 3, wherein the circular memory further comprises a data in line that is connected to each data location.

5. The datacenter of claim 4, wherein the circular memory further comprises a clock read line that is connected to each data location.

6. The datacenter of claim 5, wherein the circular memory further comprises a data out line that is connected to each data location.

7. The datacenter of claim 6, wherein the write address pointer is connected to each data location with a corresponding write enable line.

8. The datacenter of claim 7, wherein the read address pointer is connected to each data location with a corresponding read enable line.

9. The datacenter of claim 1, wherein each node includes a plurality of memory locations for data storage, and wherein the number of memory locations for each node is equal to one less than a total number of nodes.

10. A method of transferring data between nodes on a motherboard, wherein the motherboard includes a plurality of nodes and a hub, wherein each node of the plurality of nodes is coupled to the hub, and hub comprising circular memory comprising:
writing first data from a first node into a first memory position in the circular memory, wherein the first data is written at a first write clock phase, wherein the writing occurs for a first write clock time period;
writing second data from a second node into a second memory position in the circular memory, wherein the second data is written at a second write clock phase that is less than the first write phase, wherein the writing occurs for a second write time period;
reading data from the first memory position at a first read clock phase; and
reading data from the second memory position at a second read clock phase, wherein the second read clock phase and the first read clock phase are substantially identical.

11. The method of claim 10, wherein the first read clock phase is equal to or less than the first write clock phase.

12. The method of claim 11, wherein reading data from the first memory locations is occurs after a writing the first data into the first memory locations, wherein the reading is delayed from the writing by a first time period, wherein the first time period is equal to or greater than the first write time period.

13. The method of claim 12, wherein reading data from the second memory locations is occurs after a writing the second data into the second memory locations, wherein the reading is delayed from the writing by a second time period, wherein the second time period is equal to or greater than the second write time period.

14. The method of claim 13, wherein the second time period and the first time period are different.

15. The method of claim 14, wherein the first write time period is greater than the second write time period.

16. The method of claim 15, wherein the first node is spaced a first distance from the hub, wherein the second node is spaced a second distance from the hub and wherein the first distance is greater than the second distance.

17. The method of claim 10, wherein the first node is spaced a first distance from the hub, wherein the second node is spaced a second distance from the hub and wherein the first distance is greater than the second distance.

18. A method of transferring data between nodes on a motherboard, wherein the motherboard includes a plurality of nodes and a hub, wherein each node of the plurality of nodes is coupled to the hub, comprising:
writing first data from a first node into first memory locations in the circular memory;
writing second data from a second node into second memory locations in the circular memory;
reading data from the first memory locations, wherein the reading occurs simultaneous with writing the second data from the second node into the second memory locations;
writing third data from a third node into a third memory location in the circular memory;
reading data from the second memory location, wherein the reading occurs simultaneous with writing the third data from the third node into the third memory location; and
writing the data from the first slot into a memory location in the second node, wherein the writing occurs simultaneous with writing the third data from the third node into the third memory location.

19. The method of claim 18, wherein writing the first data from the first node in the first memory location occurs for a time period that is longer than writing the second data from the second node into the second memory location.

20. The method of claim 18, wherein reading data from the first slot occurs for a time period that is shorter than writing the first data from the first node in the first memory location.

* * * * *